United States Patent
Takeda et al.

(10) Patent No.: US 11,528,699 B2
(45) Date of Patent: Dec. 13, 2022

(54) BASE STATION AND USER TERMINAL

(71) Applicant: NTT DOCOMO, INC., Tokyo (JP)

(72) Inventors: Kazuki Takeda, Tokyo (JP); Shohei Yoshioka, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/260,376

(22) PCT Filed: Jul. 20, 2018

(86) PCT No.: PCT/JP2018/027403
§ 371 (c)(1),
(2) Date: Jan. 14, 2021

(87) PCT Pub. No.: WO2020/017058
PCT Pub. Date: Jan. 23, 2020

(65) Prior Publication Data
US 2021/0306987 A1    Sep. 30, 2021

(51) Int. Cl.
*H04W 72/04*    (2009.01)
*H04W 72/02*    (2009.01)
(Continued)

(52) U.S. Cl.
CPC ......... *H04W 72/042* (2013.01); *H04W 52/54* (2013.01); *H04W 72/02* (2013.01); *H04W 72/0473* (2013.01); *H04W 52/146* (2013.01)

(58) Field of Classification Search
CPC ... H04W 72/042; H04W 52/54; H04W 72/02; H04W 72/0473; H04W 52/146; H04W 52/325
See application file for complete search history.

(56) References Cited

U.S. PATENT DOCUMENTS 8,229,494 B1 * 7/2012 Kela .................. H04W 52/146
                                                            455/67.11
9,386,565 B2 * 7/2016 Yang ................ H04W 72/1284
(Continued)

OTHER PUBLICATIONS

3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).
(Continued)

*Primary Examiner* — Hoang-Chuong Q Vu
(74) *Attorney, Agent, or Firm* — Osha Bergman Watanabe & Burton LLP

(57) ABSTRACT

A base station of the present invention includes a transmitting section that transmits a plurality of pieces of downlink control information each including a first field value to be used for control of a transmission power of an uplink control channel and a second field value to be used to determine a resource for the uplink control channel; and a control section that controls, in a case that second field values each corresponding to the second field value are configured to be a same value, configuration of first field values each corresponding to the first field value. With this, it is possible to appropriately control a transmission power of an uplink control channel.

4 Claims, 12 Drawing Sheets

(51) Int. Cl.
*H04W 52/54* (2009.01)
*H04W 52/14* (2009.01)

(56) References Cited

U.S. PATENT DOCUMENTS

| | | | | |
|---|---|---|---|---|
| 10,602,456 | B2* | 3/2020 | Li | H04W 52/242 |
| 10,798,657 | B2* | 10/2020 | Palenius | H04W 88/085 |
| RE48,606 | E* | 6/2021 | Papasakellariou | H04L 5/0055 |
| 2011/0275403 | A1 | 11/2011 | Chen et al. | |
| 2012/0195292 | A1* | 8/2012 | Ko | H04L 5/0048 370/336 |
| 2014/0029538 | A1* | 1/2014 | Yang | H04W 52/04 370/329 |
| 2014/0078993 | A1 | 3/2014 | Li et al. | |
| 2014/0321406 | A1* | 10/2014 | Marinier | H04W 52/146 370/329 |
| 2016/0029239 | A1* | 1/2016 | Sadeghi | H04W 52/244 370/252 |
| 2017/0013570 | A1* | 1/2017 | Vajapeyam | H04W 4/70 |
| 2018/0092073 | A1* | 3/2018 | Nogami | H04W 52/54 |
| 2019/0215781 | A1* | 7/2019 | Jeon | H04W 24/10 |
| 2019/0246395 | A1* | 8/2019 | Huang | H04W 72/042 |
| 2019/0253986 | A1* | 8/2019 | Jeon | H04B 7/0695 |
| 2019/0342907 | A1* | 11/2019 | Huang | H04L 5/0053 |
| 2020/0083980 | A1* | 3/2020 | Papasakellariou | H04L 1/0073 |
| 2020/0366446 | A1* | 11/2020 | Matsumura | H04W 72/1273 |
| 2021/0282089 | A1* | 9/2021 | Takeda | H04W 52/247 |

OTHER PUBLICATIONS

3GPP TSG RAN WG1 RAN1 Meeting #93; R1-1807626 "Remaining issues of UL power control" MediaTek Inc.; Busan, South Korea; May 21-25, 2018 (17 pages).
International Search Report issued in International Application No. PCT/JP2018/027403, dated Sep. 25, 2018 (4 pages).
Written Opinion issued in International Application No. PCT/JP2018/027403; dated Sep. 25, 2018 (4 pages).
Extended European Search Report issued in counterpart European Patent Application No. 18926393.2, dated Feb. 23, 2022 (9 pages).
Samsung; "CR to 38.213 capturing the NR ad-hoc 1801 and RAN1#92 meeting agreements"; 3GPP TSG-RAN1 Meeting #92, R1-1803554; Athens, Greece; Feb. 26-Mar. 1, 2018 (1 page).
3GPP TS 38.213 V15.2.0; "3rd Generation Partnership Project; Technical Specification Group Radio Access Network; NR; Physical layer procedures for control (Release 15)"; Jun. 2018 (98 pages).

* cited by examiner

BASE STATION AND USER TERMINAL

TECHNICAL FIELD

The present invention relates, to a base station and a user terminal in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication System)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13, also simply referred to as "LTE" below), a user terminal controls a transmission power of an uplink control channel (for example, a PUCCH (Physical Uplink Control Channel)), based on a TPC command indicated by a certain field (transmission power control (TPC) field) value in downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In LTE, DCI for scheduling a PDSCH does not include any field dedicated to an uplink control channel resource (a PUCCH resource), and, under a certain condition, a TPC command field value is used as a PUCCH resource indicator (an ACK/NACK resource indicator (ARI) or an ACK/NACK resource offset (ARO)).

In contrast, for future radio communication systems (also simply referred to as "NR" below), DCI for scheduling a PDSCH is assumed to include a field for an indicator for an uplink control channel resource (a PUCCH resource indicator/indication (PRI), also referred to as an "ARI," an "ARO," and the like) separately from a TPC command field.

In view of this, in NR, the problem is how to use TPC command field values of respective pieces of DCI. If a plurality of pieces or DCI associated with the same uplink control channel are detected, and a TPC command indicated by at least one of TPC command field values of the plurality of pieces of DCI is not accumulated appropriately, the transmission power of the uplink control channel may consequently not be controlled appropriately.

The present invention has been made in view of the above respect, and an object of the present invention is to provide a base station and a user terminal that can appropriately control a transmission power of an uplink control channel.

Solution to Problem

An aspect of a base station of the present invention includes: a transmitting section that transmits a plurality of pieces of downlink control information each including a first field value to be used for control of a transmission power of an uplink control channel and a second field value to be used to determine a resource for the uplink control channel; and a control section that controls, in a case that second field values each corresponding to the second field value are configured to be a same value, configuration of first field values each corresponding to the first field value.

Advantageous Effects of Invention

According to the present invention, it is possible to appropriately control a transmission power of an uplink control channel.

DESCRIPTION OF EMBODIMENTS (PUCCH Format)

Figure 1:
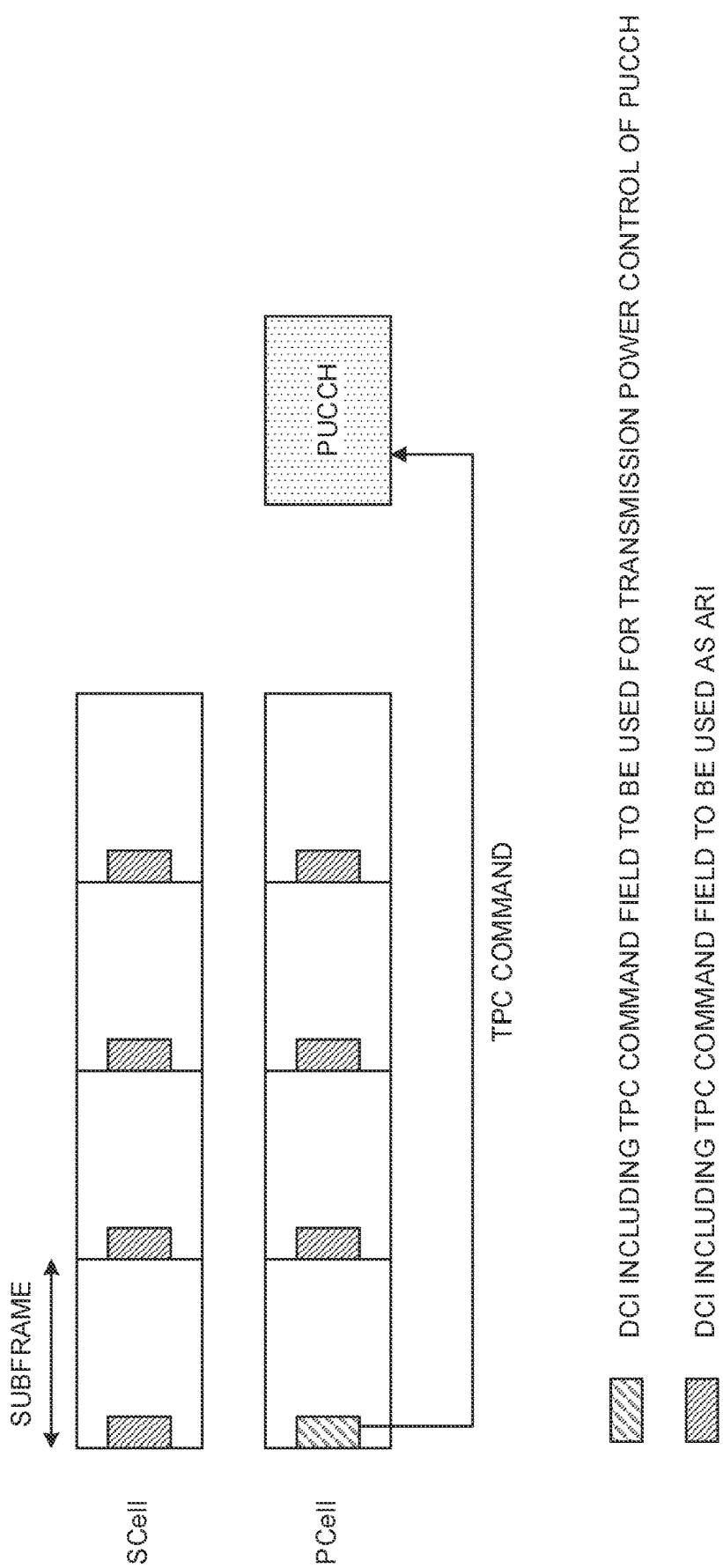
FIG. 1 is a diagram to show an example of PUCCH transmission power control in LTE.

For NR, configurations (also referred to as "formats," "PUCCH formats (PFs)," and the like) for an uplink control channel (for example, a PUCCH) to be used for transmission of uplink control information (UCI) are under study.

Here, UCI may include at least one of transmission acknowledgement information (HARO-ACK (Hybrid Automatic Repeat reQuest-ACKnowledge) or ACK/NACK (ACKnowledge/Non-ACK)), a scheduling request (SR), and channel state information (CSI) for a downlink shared channel (for example, a PDSCH (Physical Downlink Shared Channel)).

For example, for NR, the following PUCCH formats are under study:

PUCCH format (also referred to as "PF0," "short PUCCH," and the like) to be used for transmission of UCI of one or two bits (for example, at least one of an HARQ-ACK and an SR) and to be transmitted using one or two symbols, PUCCH format (also referred to as "PF1," "long PUCCH," and the like) to be used for transmission of UCI of one or two bits (for example, at least one of an HARQ-ACK and an SR) and to be transmitted using four or more symbols, PUCCH format (also referred to as "PF2," "short PUCCH," and the like) to be used for transmission of UCI of more than two bits and to be transmitted using one or two symbols, PUCCH format (also referred to as "PF3," "long PUCCH," and the like) to be used for transmission of UCI of more than two bits and to be transmitted using four or more symbols, and PUCCH format (also referred to as "PF4," "long PUCCH," and the like) to be used for transmission of UCI of more than two bits, to be transmitted using four or more symbols, and in which a PUCCH resource includes an orthogonal cover code (OCC).

A PUCCH in any of the above PUCCH formats may be transmitted in a specific cell in a group including one or more cells (also referred to as a "cell group (CG)," a "PUCCH group," and the like). This specific cell may be, for example, a primary cell (PCell), a primary secondary cell (PSCell), a secondary cell (SCell) for PUCCH transmission (PUCCH-SCell), or the like. Note that the "cell" may be interpreted as a "serving cell," a "component carrier (CC)," a "carrier," and the like.

(PUCCH Resource)

In NR, a set or one or more resources for a PUCCH (PUCCH resources) may be configured by higher layer signaling. Note that configuration by higher layer signaling may mean notification of configuration information from a base station (BS) (also referred to as a "transmission/reception point (TRP)," an "eNB (eNodeB)," a "gNB (NR NodeB)," and the like) to a user terminal (also referred to as a "UE (User Equipment)," a "terminal," a "mobile station (MS)," and the like).

Higher layer signaling may be at least one of the followings, for example:

RRC (Radio Resource Control) signaling,

MAC (Medium Access Control) signaling (for example, MAC control elements (MAC CEs), and MAC PDUs (Protocol Data Units)), Information transmitted on a broadcast channel (for example, a PBCH (Physical Broadcast Channel) (for example, a master information block (MIB)), and System information (for example, a system information block (SIB), minimum system information (RMSI (Remaining Minimum System Information), and other system information (OSI).

For example, a set including one or more PUCCH resources (PUCCH resource set) may be configured for each partial band (bandwidth part (BWP)) configured in a CC, by higher layer signaling.

Each PUCCH resource in the PUCCH resource set configured by higher layer signaling may be associated with any of the values of certain fields in DCI (also referred to as a "PUCCH resource indicator/indication (PRI) field," an "ACK/NACK resource indicator (ARI) field," an "ACK/NACK resource offset (ARO) field," a "second field," and the like). The DCI may be DCI (DL assignment or DCI format 1_0 or 1_1) to be used for scheduling of a PDSCH.

The user terminal determines a PUCCH resource to be used for transmission of UCI, based on the value in PRI field in DCI. The PRI field may be of x bits (for example, x=3). In a case that a PUCCH resource set includes PUCCH resources the number of which is a value of 2 raised to the power of x (for example, eight if x=3) or less, the user terminal may determine the PUCCH resource associated with the PRI field value, as a PUCCH resource for UCI transmission.

In contrast, in a case that a PUCCH resource set includes the PUCCH resources more than the value of 2 raised to the power of x (for example, eight if x=3), the user terminal may determine a PUCCH resource for UCI transmission, based on other parameters in addition to the PRI field value (also referred to as a "$\Delta_{PRI}$," a "PRI," an "ARI," an "ARO," and the like). Such other parameters may include at least one of the followings:

Number ($N_{CCE, p}$) of control channel elements (CCEs) in a control resource set (CORESET) p for reception of a downlink control channel (for example, a PDCCH (Physical Downlink Control Channel)) for transmitting DCI including the PRI field and Index ($n_{CCE, p}$, CCE index) of a CCE (for example, the first CCE) for reception of the downlink control channel.

Note that each PUCCH resource may include, for example, at least one of the number of symbols allocated to the PUCCH, a start index of a symbol, a resource block allocated to the PUCCH (also referred to as a "physical resource block (PRB)" and the like), a start index of the resource block, whether or not to employ frequency hopping in a slot, a start index of a second-hop PRB in a case of employing frequency hopping, and the like.

Each PUCCH resource may be associated with any of the above-described PUCCH formats and include a resource specific to the associated PUCCH format (for example, initial cyclic shift of PF0, time-domain OCC of PF1, an OCC length of PF4, OCC index, or the like).

(Transmission Power Control for PUCCH)

In NR, a transmission power of a PUCCH is controlled based on a TPC command (also referred to as a "value," an "increased/decreased value," a "correction value," and the like) indicated by a certain field (also referred to as a "TPC command field," a "first field," and the like) in DCI.

For example, a PUCCH transmission power ($P_{PUCCH, b, f, c}$ (i, $q_u$, $q_d$, l)) for a transmission occasion (also referred to as a "transmission duration (period)" and the like) i for a BWP b of a carrier f in a cell c using an index l for a power control adjustment state may be expressed as Equation (1) below.

Here, the power control adjustment state may be configured to include a plurality of states (for example, two states) or a single state, by using a higher layer parameter. In a case that a plurality of power control adjustment states are configured, one of the plurality of power control adjustment states may be identified by the index l (for example, l ∈ {0, 1}). The power control adjustment state may be referred to as a "PUCCH power control adjustment state," a "first or second state," and the like.

The PUCCH transmission occasion i is a certain period in which the PUCCH is transmitted and may be configured of, for example, one or more symbols, one or more slots, or the like.

$$P_{PUCCH,b,f,c}(i, q_u, q_d, l) = \min \begin{cases} P_{CMAX,f,c}(i), \\ P_{O\_PUCCH,b,f,c}(q_u) + 10\log_{10}\left(2^\mu \cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i, l) \end{cases}$$

[Equation 1]

In Equation (1), $P_{CMAX, f, c(i)}$ denotes, for example, a transmission power (also referred to as a "maximum transmission power" and the like) for a user terminal, the transmission power being configured for the carrier f in the cell c in the transmission occasion i. $P_{O\_PUCCH, b, f, c}(q_u)$ denotes, for example, a parameter related to a target received power configured for the BWP b in the carrier f in the cell c in the transmission occasion i (for example, a parameter related to a transmission power offset, also referred to as a "transmission power offset P0," a "target received power parameter," or the like).

$M^{PUCCH}_{RB, b, g, c}(i)$ denotes, for example, the number of resource blocks (bandwidth) allocated to the PUCCH for the transmission occasion i in an uplink BWP b in the carrier f in the cell c and a subcarrier spacing μ. $PL_{b, g, c}(q_d)$ denotes, for example, a path loss calculated by the user terminal by using an index $q_d$ of a downlink BWP reference signal associated with the uplink BWP b in the carrier f in the cell c.

$\Delta_{F\_PUCCH}(F)$ denotes a higher layer parameter given for each PUCCH format. $\Delta_{TF, b, f, c}(i)$ denotes a transmission power adjustment component (offset) for the uplink BWP b in the carrier of the cell c.

$g_{b, f, c}(i, l)$ denotes a value (for example, an accumulated value of a TPC command) based on a TPC command having the power control adjustment state index l of the uplink WP in the carrier f in the cell c and the transmission occasion i. For example, the accumulated value of a TPC command may be expressed as Equation (2).

$$g_{b,f,c}(i,l) = g_{b,f,c}(i_{last}, l) + \delta_{PUCCH,b,f,c}(i_{last}, K_{PUCCH}, l)$$ [Equation 2]

In Equation (2), $\delta_{PUCCH, b, f, c}(i_{last}, i, K_{PUCCH}, l)$ may denote, for example, a TPC command indicated by a TPC command field value in DCI (for example, in DCI format 1_0 or 1_1) detected in the uplink BWP b in the carrier f in the cell c for the transmission occasion i after the last PUCCH transmission occasion $i_{last}$ or a TPC command indicated by a TPC command field value in DCI (for example, in DCI format 2_2) having a CRC parity bit scrambled with a specific RNTI (Radio Network Temporary Identifier) (for example, TPC-PUCCH-RNTI) (CRC-scrambled).

Note that Equations (1) and (2) are merely examples, and the embodiment is not limited the equations. The user terminal only needs to control a PUCCH transmission power, based on at least one of the parameters included as examples in Equations (1) and (2), and may include additional parameters or may include the parameters with part of the parameters being omitted. In Equations (1) and (2), a PUCCH transmission power is controlled for each BWP in a certain carrier in a certain cell, but the control is not limited thereto. At least part of a "cell," a "carrier," a "BWP," and a "power control adjustment state" may be omitted.

In the case of controlling a PUCCH transmission power, based on an accumulated value of a TPC command as described above, the problem is which piece of DCI includes a TPG command field value that indicates a TPC command to be accumulated, when a plurality of pieces of DCI each including a TPC command field value are detected.

For example, in LTE, a TPC command field value in a single piece of DCI detected in a specific cell (for example, a PCell or a PSCell) is used as a TPC command. In LTE, a TPC command field value in another piece of DCI (for example, DCI detected in an SCell or DCI detected in a PCell or a PSCell but having a counter DAI (Downlink Assignment Index) being greater than one), in contrast, is used as a PRI instead of a TPC command.

FIG. 1 is a diagram to show an example of PUCCH transmission power control in LTE. For example, in FIG. 1, carrier aggregation (CA) for aggregating a PCell and an SCell is performed. In FIG. 1, it is assumed that the user terminal detects a plurality of pieces of DCI in each of a plurality of subframes (here, four subframes) in each of both the PCell and the SCell and transmits, on a PUCCH, UCI including an HARQ-ACK for a PDSCH to be scheduled by each of the plurality of pieces of DCI.

In the case shown in FIG. 1, a TPC command field value in a piece of DCI that is detected in the PCell and has a counter DAI of 1 is used for the PUCCH transmission power, and the TPC command indicated by the TPC command field value is accumulated. In the case shown in FIG. 1, a TPC command field value in each of the other pieces of DCI, in contrast, is used as a PRI, and the TPC command indicated by the TPC command field value is not accumulated. Note that PRI values in a plurality of pieces of DCI in the same subframe may be the same.

As described above, in LTE, DCI to be used for scheduling of a PDSCH does not include any field dedicated to PRI, and instead, a TPC command field is used as a PRI when a certain condition is satisfied. In contrast, in NH, DCI to be used for scheduling of a PDSCH (for example, DCI format 1_0 or 1_1) includes a TPC command field (for example, two bits) and a PRI field (for example, three lots) separately.

Figure 2:
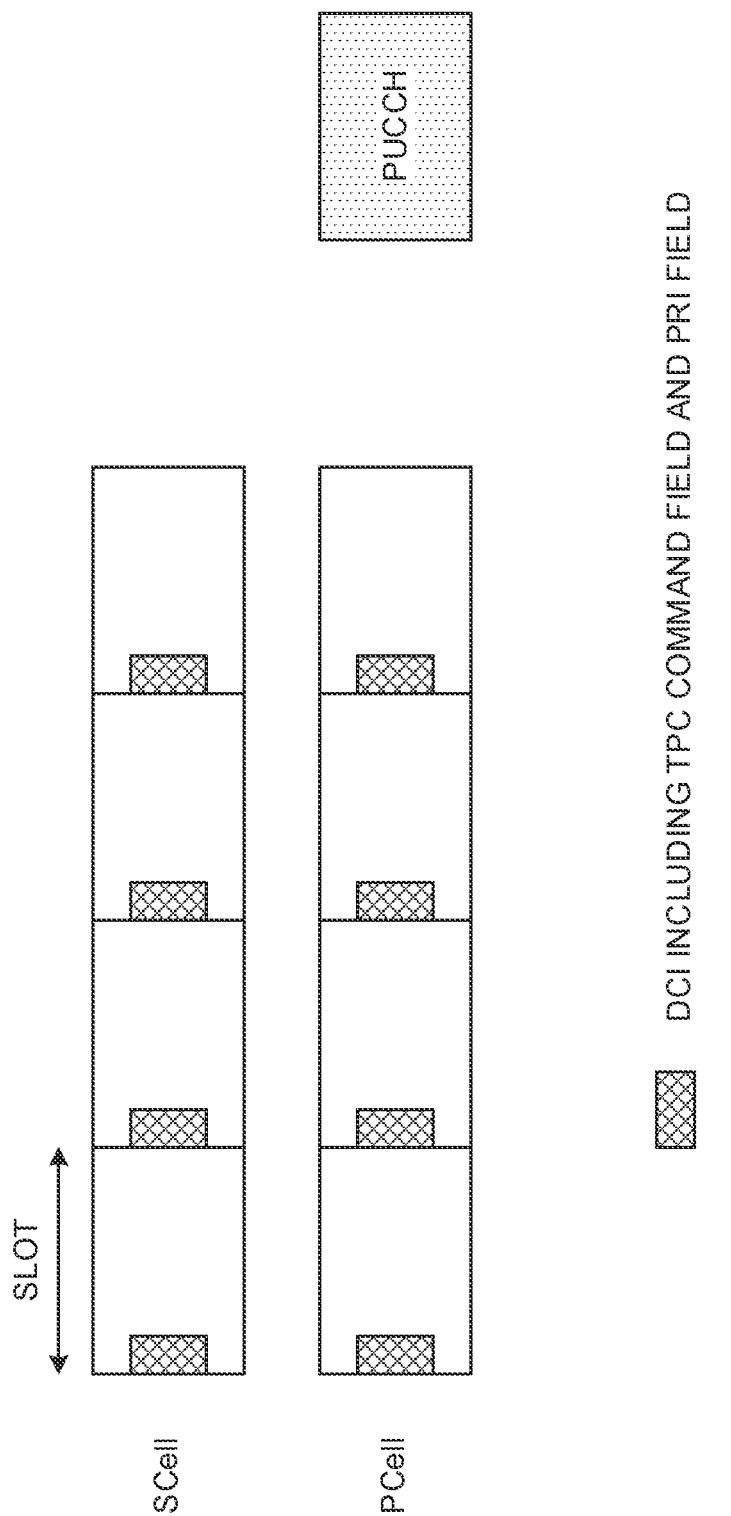
FIG. 2 is a diagram to show an example of PUCCH transmission power control in NR.

FIG. 2 is a diagram to show an example of PUCCH transmission power control in NR. In FIG. 2, it is assumed that the user terminal detects a plurality of pieces of DCI in each of a plurality of sots (here, four slots) in each of both a PCell and an SCell and transmits, on a PUCCH, UCIs including HARQ-ACKs for PDSCHs to be scheduled by the plurality of respective pieces of DCI.

Here, a slot is a unit of scheduling in NR and may be controlled in terms of time length, based on subcarrier spacing (SCS). For example, in a case that a SCS is 15 kHz, the slot length may be 1 ms.

As illustrated in FIG. 2, if HARQ-ACHs of PDSCHs to be scheduled by a plurality of respective pieces of DCI are transmitted on the same PUCCH, and TPC commands indicated by the TPC command field values included in the plurality of respective pieces of DCI are not accumulated appropriately, a transmission power of the same PUCCH may consequently not be controlled appropriately.

In view of this, the inventors of the present invention studied a method of appropriately controlling a transmission power of a PUCCH to be used for transmission of DCI including HARO-ACKs for PDSCHs to be scheduled by respective one or more pieces of DCI, and reached the present invention.

The present embodiment will be described below in detail. In the following, a long PUCCH in PUCCH format 3 or 4 described above or the like is illustrated in the drawings, but the format of a PUCCH is not limited thereto. The number of symbols allocated to a PUCCH only needs to be at least part of a slot, and the present embodiment may be applied to control or a transmission power in any type of PUCCH format.

In the present embodiment, for example, a user terminal may receive a plurality of DCI each including a TPC command field value (a first field value) and a PRI field value (a second field value). In a case that the same PUCCH resource is determined based on the PRI field values included in the plurality of respective DCI, the user terminal may control accumulation of TPC commands indicated by the TPC command field values included in the plurality of respective DCI.

Note that, in the present embodiment, the "case that the same PUCCH resource is determined based on the PRI field values included in the plurality of respective pieces of DCI" may be a "case that the PRI field values included in the plurality of respective pieces of DCI are the same value" or may be a "case that the PRI field values included in the plurality of respective pieces of DCI are the same value and other parameters (for example, at least one of CCE indices and the numbers of CCEs in CORESET) related to the plurality of pieces of DCI are the same."

The plurality of pieces of DCI may be interpreted as a "plurality of pieces of DCI indicating the same PUCCH resource," a "plurality of pieces of DCI associated with the same PUCCH," and the like. Each of the plurality of pieces of DCI may be DCI (for example, in DCI format 1_0 or 1_1) to be used for PDSCH scheduling. The plurality of pieces of DCI may be mapped to the same power control adjustment state index l.

In the present embodiment, the TPC command field value in each of the pieces of DCI indicates an increased/decreased value (dB) of a transmission power, as a TPC command. It is assumed, for example, that TPC command field values "0," "1," "2," and "3" indicate −1, 0, +1, and +3 [dB], respectively, but association between increased/decreased values and values is not limited thereto.

(First Aspect)

In a first aspect, TPC commands indicated by TPC command field values of a plurality of pieces of DCI indicating the same PUCCH resource in a certain slot may be accumulated.

Figure 3:
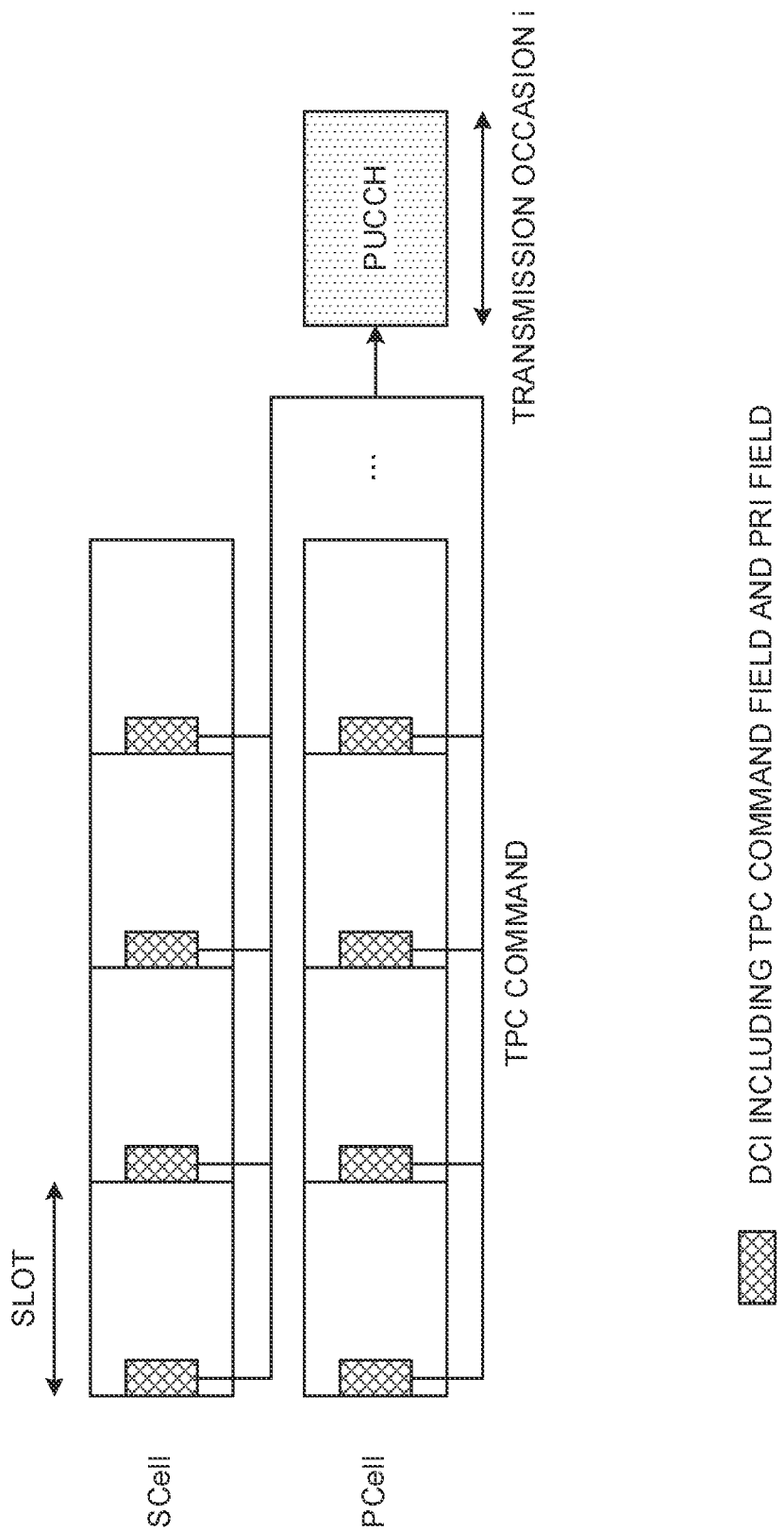
FIG. 3 is a diagram to show an example of TPC command accumulation according to a first aspect.

FIG. 3 is a diagram to show an example of TPC command accumulation according to the first aspect. In FIG. 3, it is assumed that the user terminal detects a plurality of pieces of DCI (here, eight pieces of DCI) in a plurality of slots (here, four slots) in both a PCell (which may be a PSCell or the like) and an SCell and transmits, on the same PUCCH in a certain slot, pieces of UCI including HARQ-ACKs for PDSCHs to be scheduled by the plurality of respective pieces or DCI.

In FIG. 3, the same PUCCH resource is determined based on PRI field values of the plurality of respective pieces of DCI thus detected. In the case shown in FIG. 3, the user terminal may control a PUCCH transmission power, based on the accumulated value of TPC commands indicated by TPC command field values in all the pieces of DCI among the plurality of pieces of DCI.

For example, in a case that TPC command field values of four respective pieces of DCI detected in the PCell in FIG. 3 indicate +3, +3, +3, and +3 [dB], and TPC command field values of four respective pieces of DCI detected in the SCell indicate +1, +1, +1, and +1 [dB], the accumulated value of the TPC commands indicated by the eight pieces of DCI is +16 [dB].

In contrast, if TPC command field values of four respective pieces of DCI detected in the PCell in FIG. 3 indicate +1, +1, +1, and +1 [dB] and TPC command field values of four respective pieces of DCI detected in the SCell indicate −1, −1, −1, and −1 [dB], the accumulated value of the TPC commands indicated by the eight pieces of DCI is 0 [dB].

The user terminal may control, in a PUCCH transmission occasion i, a PUCCH transmission power for the transmission occasion i, based on the accumulated value (for example, $g_{b,f,c}(i, l)$) obtained by adding the TPC command values indicated by the plurality of pieces of DCI (here eight pieces of DCI) to the accumulated value (for example, $g_{b,f,c}(i_{last}, l)$) for the last transmission occasion $i_{last}$ having the same power adjustment state index l.

According to the first aspect, TPC commands indicated by TPC command field values of a plurality of respective pieces of DCI indicating the same PUCCH resource in a certain slot are accumulated. In this way, it is possible to control transmission power of a PUCCH to be used for transmission or pieces of UCI including HARQ-ACKs of PDSCHs to be scheduled by the plurality of respective pieces of DCI, in a greater range than that in a case based on a single TPC command.

(Second Aspect)

In a second aspect, a TPC command indicated by a TPC command field value of a specific piece of DCI among a plurality of pieces of DCI indicating the same PUCCH resource in a certain slot may be accumulated.

<First Accumulation>

In first accumulation, a specific DCI having a TPC command to be accumulated among a plurality of pieces of DCI indicating the same PUCCH resource in a certain slot may be, for example, a certain DCI for scheduling a PDSCH in a specific cell. The specific cell may be, for example, a downlink cell corresponding to a PCell, a PSCell, or a PUCCH-SCell. In a case that a counter DAI is included in the certain DCI, the specific DCI may be DCI having a certain value (for example, 1) as a DAI field value to be used as the counter DAI.

The user terminal may discard the TPC commands indicated by TPC command field values in the pieces of DCI other than the specific piece of DCI among the plurality of pieces of DCI.

Figure 4:
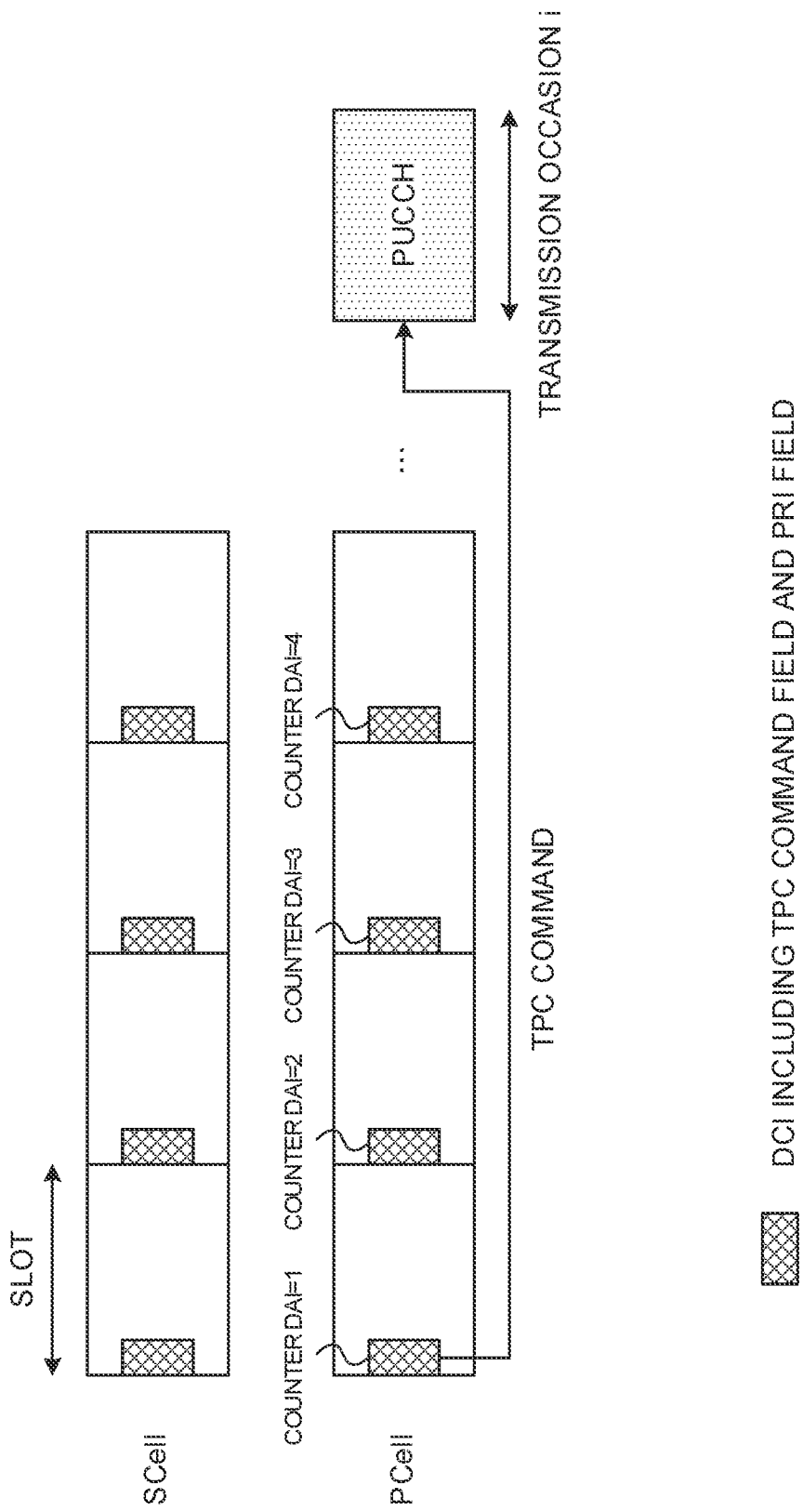
FIG. 4 is a diagram to show an example of first accumulation of a TPC command according to a second aspect.

FIG. 4 is a diagram to show an example of first accumulation of a TPC command according to the second aspect. In FIG. 4, differences from FIG. 3 will be mainly described. In FIG. 4, the same PUCCH resource is determined based on PRI field values of a plurality of respective pieces of DCI detected. In the case shown in FIG. 4, the user terminal may control a PUCCH transmission power, based on the accumulated value of a TPC command indicated by a TPC command field value in the piece of DCI for scheduling a PDSCH in a specific cell among the plurality of pieces of DCI.

For example, in FIG. 4, a TPC command indicated by a TPC command field value in the piece of DCI that schedules a PDSCH in a specific cell (here, a PCell) and has a DAI field value (counter DAI) of 1 may be accumulated.

Specifically, the user terminal may control, in the PUCCH transmission occasion i, a PUCCH transmission power for the transmission occasion i, based on the accumulated value (for example, $g_{b,f,c}(i, l)$) obtained by adding a TPC command value indicated by the piece of DCI having a counter DAI of 1 to the accumulated value (for example, $g_{b,f,c}(i_{last},$ 1)) for the last transmission occasion $i_{last}$ having the same power adjustment state index l.

In FIG. 4, the user terminal may, in contrast, discard TPC commands indicated by TPC command field values in the pieces of DCI that schedule PDSCHs in the specific cell and each have a counter DAI greater than 1.

The user terminal may discard TPC commands indicated by TPC command field values in the pieces of DCI scheduling PDSCHs in a cell (here, the SCell) other than the specific cell.

<Second Accumulation>

In second accumulation, the specific DCI having a TPC command to be accumulated among the plurality of pieces of DCI indicating the same PUCCH resource in the certain slot may be, for example, a certain DCI for scheduling the last PDSCH before the PUCCH transmission occasion i.

In a case of scheduling the last PDSCH before the PUCCH transmission occasion i, in each of a plurality of cells, the specific DCI may be DCT in a cell having a certain index (also referred to as a "CC index," a "carrier index," and the like). For example, the cell having the certain index may be the first cell in descending order of indices (that is, the cell having the greatest index value) among the plurality of cells or may be the first cell in ascending order of indices (that is, the cell having the smallest index value).

Alternatively, in a case of scheduling the last PDSCH before the PUCCH transmission occasion i, in each of a plurality of cells, the specific DCI may be DCI for scheduling a PDSCH in any cell. In this case, the user terminal may assume that TPC command field values in the plurality of pieces of DCI for scheduling PDSCHs at the same timing (slot) in the plurality of cells are the same. In a case of scheduling a plurality of PDSCHs in a plurality of cells at the same timing (slot), the base station may configure TPC command field values in the plurality of pieces of DCI for scheduling the plurality of PDSCHs, to have the same value.

The user terminal may discard the TPC commands indicated by the TPC command field values in the pieces of DCI other than the specific piece of DCI among the plurality of pieces of DCI.

Figure 5:
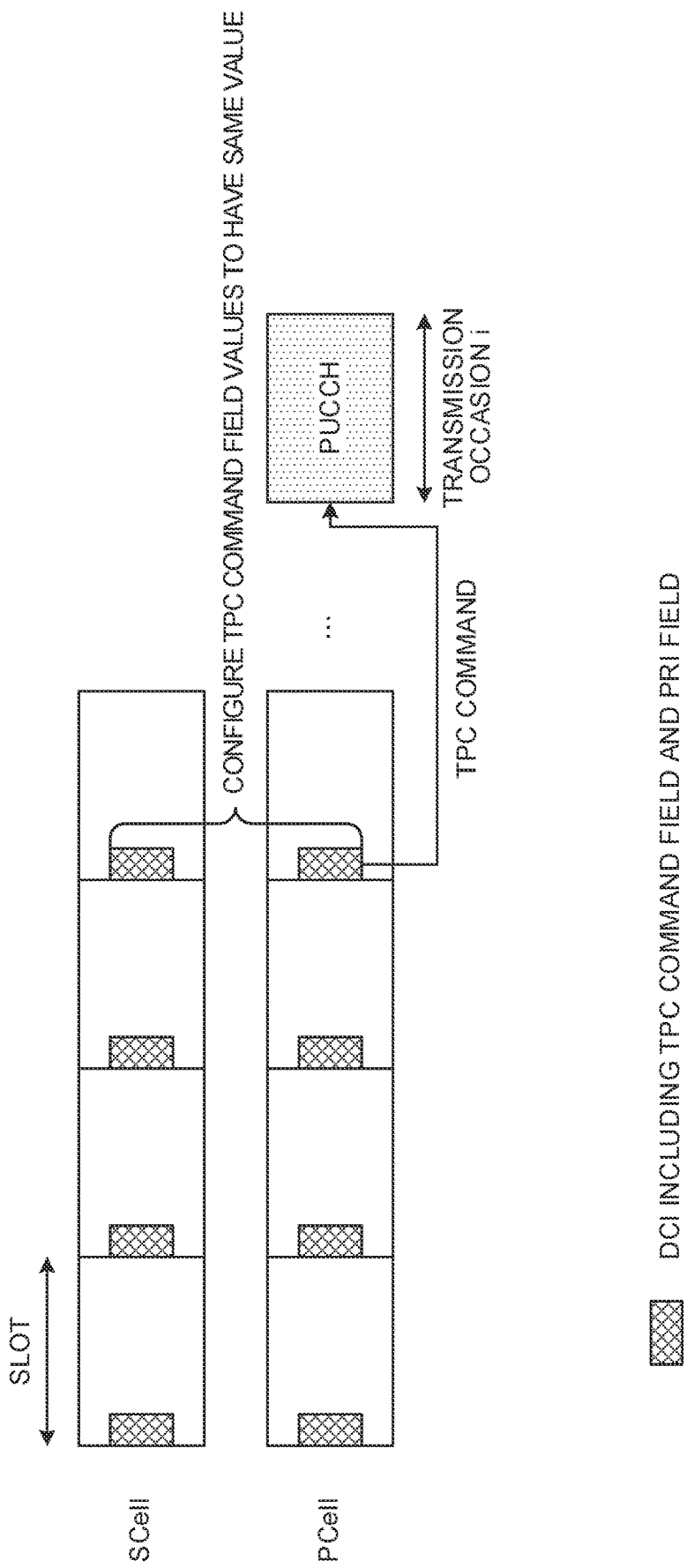
FIG. 5 is a diagram to show an example of second accumulation of a TPC command according to the second aspect.

FIG. 5 is a diagram to show an example of second accumulation of a TPC command according to the second aspect. In FIG. 5, differences from FIG. 4 will be mainly described. In FIG. 5, the same PUCCH resource is determined based on PRI field values of a plurality of respective pieces of DCI detected.

In the case shown in FIG. 5, the user terminal may control a PUCCH transmission power, based on the accumulated value of a TPC command indicated by a TPC command field value in the piece of DCI for scheduling the last PDSCH before the PUCCH transmission occasion i among the plurality of pieces of DCI.

In FIG. 5, the base station configures TPC command field values in the plurality of pieces of DCI for scheduling PDSCHs at the same timing (slot) in the plurality of cells (here, a PCell and an SCell), to be the same. Hence, in the case of scheduling the last PDSCHs for the PUCCH transmission occasion i in a plurality of cells, the user terminal may accumulate the TPC command indicated by the TPC command field value in the piece of DCI for scheduling the PDSCH in any of the cells (here, the PCell).

In FIG. 5, the user terminal may control, in the PUCCH transmission occasion i, a PUCCH transmission power for the transmission occasion i, based on the accumulated value (for example, $g_{b,f,c}(i, l)$) obtained by adding a TPC command value indicated by the piece of DCI for scheduling the last PDSCH to the accumulated value (for example, $g_{b,f,}$ $c(i_{last}, l)$) for the last transmission occasion $i_{last}$ having the same power adjustment state index l.

In FIG. 5, the user terminal may, in contrast, discard TPC commands indicated by TPC command field values in the pieces of DCI for scheduling PDSCHs other than the last PDSCH before the PUCCH transmission occasion i.

Note that, although not shown, in the case of scheduling the last PDSCHs for the PUCCH transmission occasion i, in a plurality of cells, a TPC command indicated by a TPC command field value in the piece of DCI for scheduling a PDSCH in a certain cell (for example, the cell having the greatest or smallest index value) may be accumulated.

In this case, the user terminal may discard TPC commands indicated by TPC command field values in not only the pieces of DCI for scheduling the PDSCHs other than the last PDSCH for the PUCCH transmission occasion i but also the pieces of DCI for scheduling PDSCHs in the cell other than the certain cell including the last PDSCH.

According to the second aspect, a TPC command indicated by a TPC command field value of a specific piece of DCI among a plurality of pieces of DCI indicating the same PUCCH resource in a certain slot is accumulated. In this way, it is possible to easily control a transmission power of a PUCCH to be used for transmission of UCIs including HARQ-ACKs of PDSCHs to be scheduled by the plurality of respective pieces of DCI.

(Third Aspect)

In a third aspect, a TPC command indicated by a TPC command field value in any piece of DCI among a plurality or pieces of DCI indicating the same PUCCH resource in a certain slot may be accumulated. A piece of DCI having a TPC command field value indicating a TPC command to be accumulated among the plurality of pieces of DCI may depend on implementation of the user terminal.

For example, in a case of detecting a plurality of pieces of DCI indicating the same PUCCH resource in at least one of the time domain and the frequency domain, the user terminal may accumulate a TPC command indicated by a TPC command field value in a piece of DCI for scheduling a certain PDSCH. Here, the certain PDSCH may be, for example, the last or first PDSCH, a PDSCH in a downlink cell corresponding to a PCell, a PSCell, or a PUCCH-SCell, or a PDSCH having a slot of the greatest or smallest slot number.

Alternatively, in the case of detecting a plurality of pieces of DCI indicating the same PUCCH resource in at least one of the time domain and the frequency domain, the user terminal may accumulate a TPC command indicated by a TPC command field value in a piece of DCI detected in the slot of a certain slot number (for example, the greatest or smallest number) and, more specifically, a certain search space for example, a search space having the greatest or smallest search space index or a search space for monitoring a certain DCI format (for example, DCI format 1_1)) in the slot.

Alternatively, in the case of detecting a plurality of pieces of DCI indicating the same PUCCH resource in at least one of the time domain and the frequency domain, the user terminal may accumulate a TPC command indicated by a TPC command field value in a piece of DCI detected in a CC of a cell having a certain CC index (for example, the cell having the smallest or greatest CC index).

The base station uses the same value for TPC command field values in the plurality of pieces of DCI indicating the same PUCCH resource (for example, having the same PRI field value). The plurality of pieces or DCI may be pieces of user terminal specific DCI. The user terminal does not expect that the TPC command field values in the plurality of pieces of DCI are different from each other (expects that the TPC command field values are the same value).

In the case of detecting a plurality of pieces of DCI indicating the same PUCCH resource in at least one of the time domain and the frequency domain, the user terminal may use TPC command field values in the pieces of DCI other than the piece of DCI selected with reference to the above-described criterion, as virtual cyclic redundancy check (CRC) bits.

Figure 6:
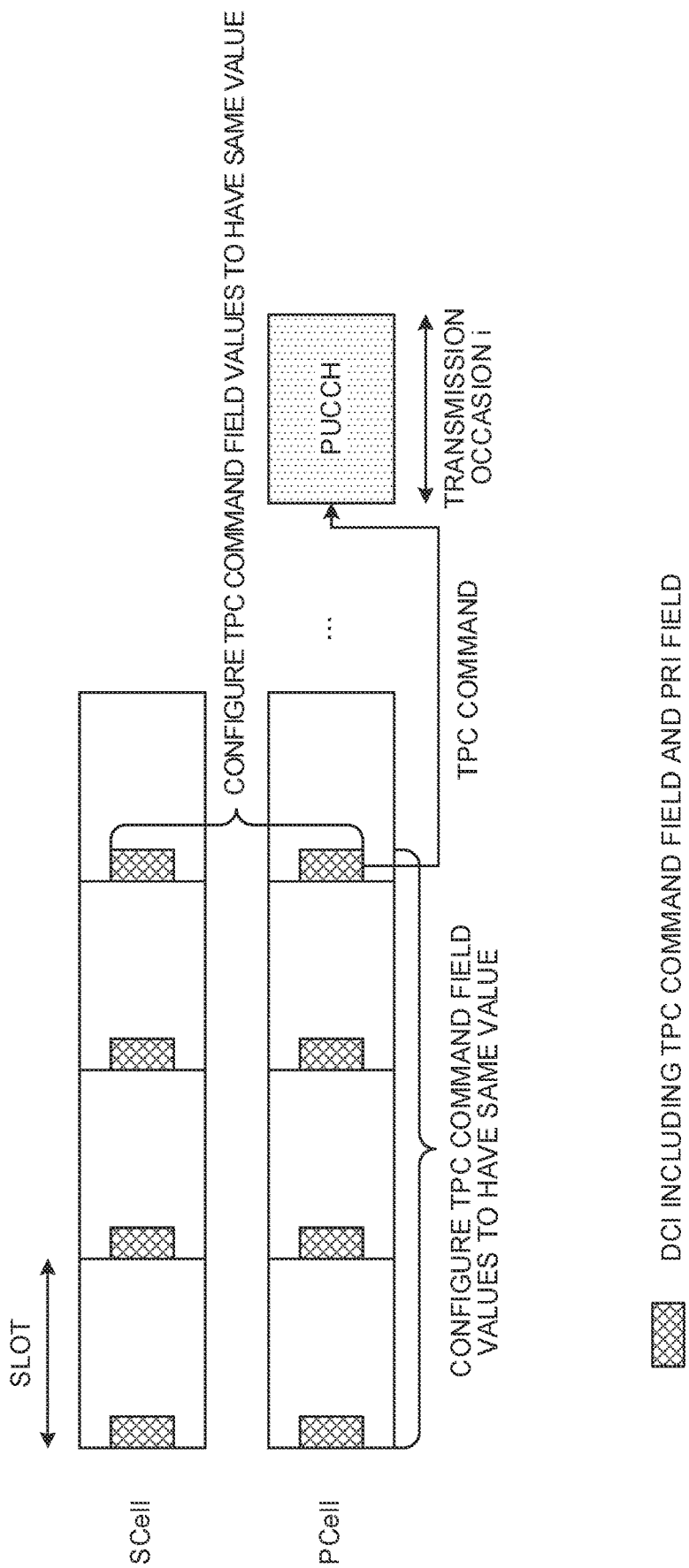
FIG. 6 is a diagram to show an example of TPC command accumulation according to a third aspect.

FIG. 6 is a diagram to show an example of TPC command accumulation according to the third aspect. In FIG. 6, differences from FIG. 5 will be mainly described. In FIG. 6, the same PUCCH resource is determined based on PRI field values of a plurality of respective pieces of DCI detected.

In the case shown in FIG. 6, the user terminal may control a PUCCH transmission power, based on the accumulated value of a TPC command indicated by a TPC command field value in the piece of DCI for scheduling any PDSCH (for example, in FIG. 6, the last PDSCH in a Pcell) among the plurality of pieces of DCI.

In FIG. 6, the base station configures TPC command field values in the plurality of pieces of DCI for scheduling PDSCHs in different cells (here, the PCell and the SCell) at different timings (slots), to be the same. Hence, in a case of scheduling a plurality of PDSCHs being different in at least one of time domain and frequency domain, the user terminal may accumulate the TPC command indicated by the TPC command field value in the piece of DCI for scheduling the PDSCH in any cell (here, the last PDSCH in the Pcell).

In FIG. 6, the user terminal may control, in the PUCCH transmission occasion i, a PUCCH transmission power for the transmission occasion i, based on the accumulated value (for example, $g_{b, f, c}(i, l)$) obtained by adding a TPC command value indicated by any piece of DCI (here, the piece of DCI for scheduling the last PDSCH in the Pcell) to the accumulated value (for example, $g_{b, f, c}(i_{last}, l)$) for the last transmission occasion $i_{last}$ having the same power adjustment state index l.

In FIG. 6, the user terminal may, in contrast, use the TPC command field values in the pieces of DCI other than the selected piece of DCI (here, the piece of DCI in the last PDSCH in the Pcell), as virtual CRC bits.

According to the third aspect, the base station uses the same value for TPC command field values in the plurality of pieces of DCI indicating the same PUCCH resource. Hence, the user terminal can accumulate a TPC command indicated by a TPC command field value in any piece of DCI. In this way, it is possible to appropriately control a transmission power of a PUCCH to be used for transmission of UCIs including HARQ-ACKs of PDSCHs to be scheduled by the plurality of respective pieces of DCI.

(Radio Communication System)

Hereinafter, a structure of a radio communication system according to the present embodiment will be described. In this radio communication system, the radio communication method according to each embodiment of the present disclosure described above may be used alone or may be used in combination for communication.

Figure 7:
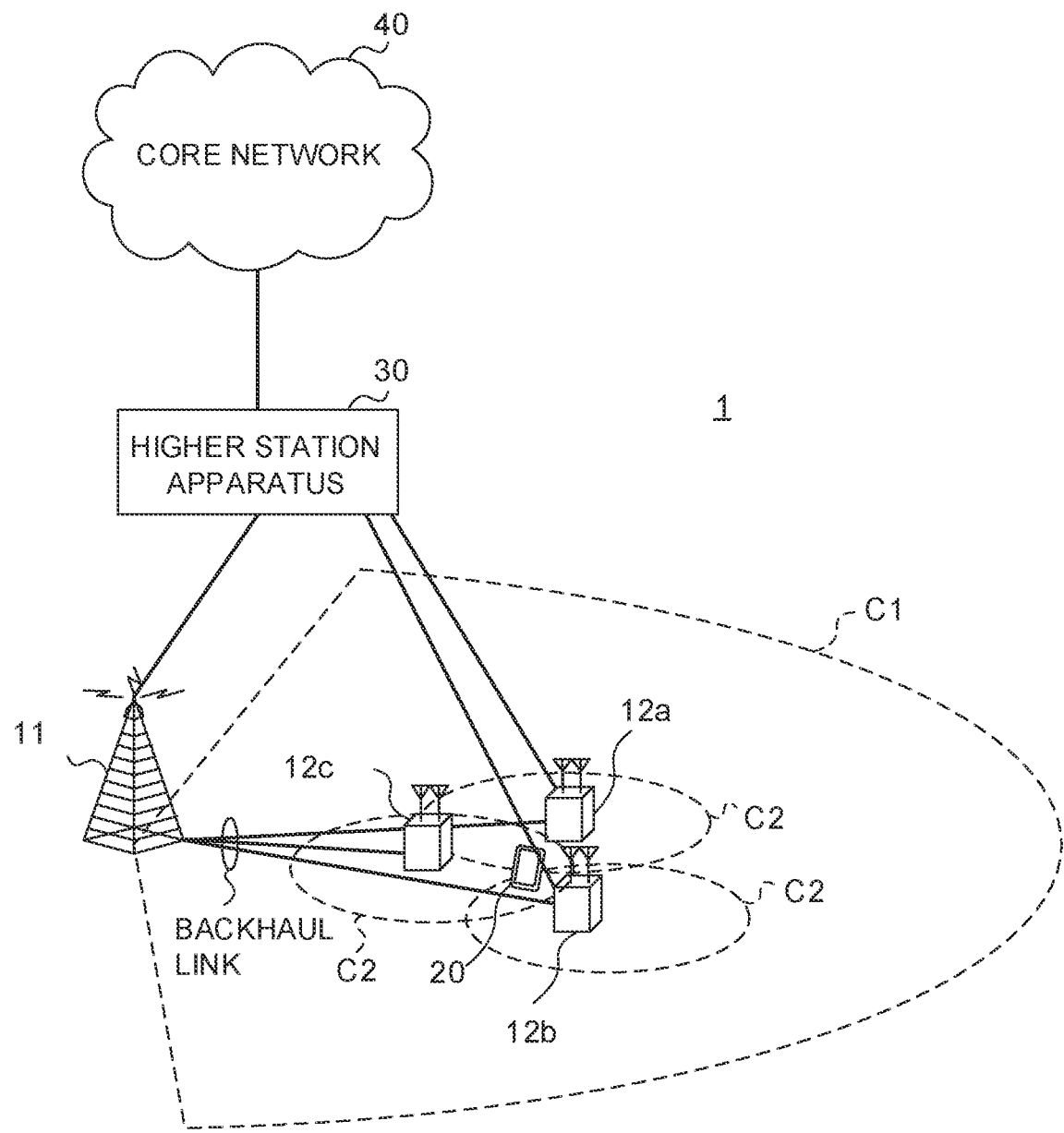
FIG. 7 is a diagram to show an example of a schematic structure of a radio communication system according to the present embodiment.

FIG. 7 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDNA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the DCI for scheduling DL data reception may be referred to as "DL assignment," and the DCI for scheduling UL data transmission may be referred to as "UL grant."

The number of OFDM symbols to be used for the PDCCH may be transmitted on the PCFICH. Transmission confirmation information (for example, also referred to as "retransmission control information," "HARQ-ACK," "ACK/NACK," and so on) of HARQ (Hybrid Automatic Repeat reQuest) to a PUSCH may be transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 8:
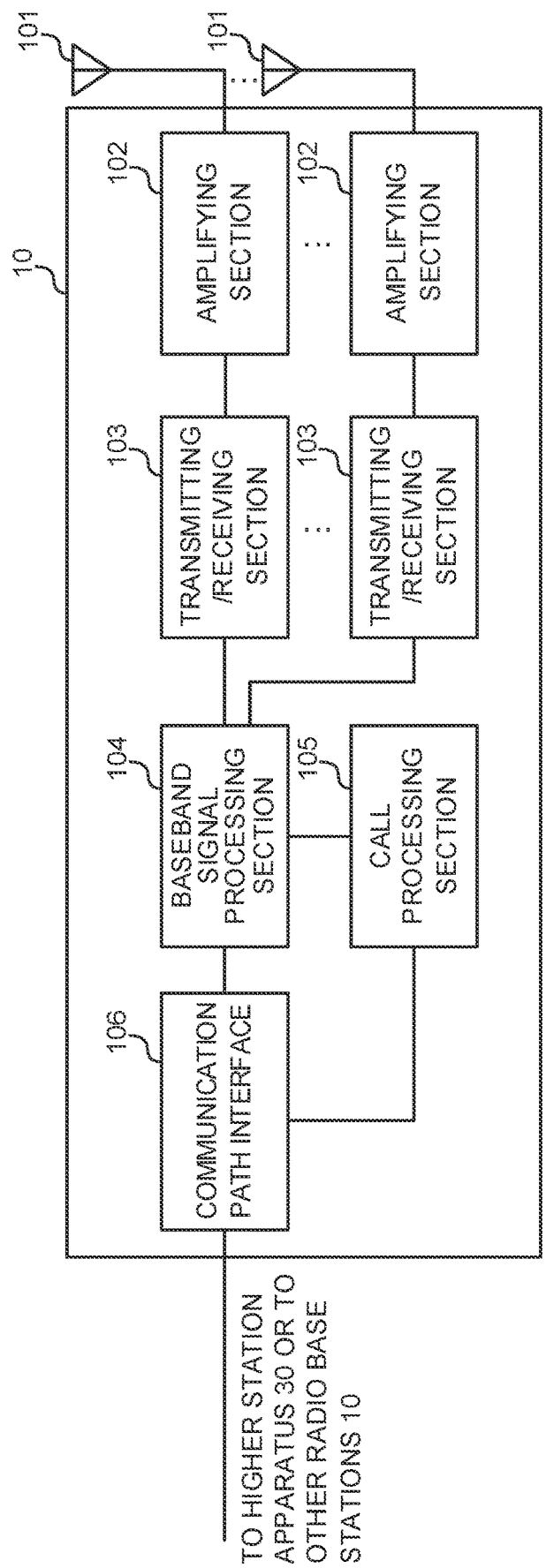
FIG. 8 is a diagram to show an example of an overall structure of a radio base station according to the present embodiment.

FIG. 8 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and and from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing, and so on) for communication channels, manages the state of the radio base station 10, manages the radio resources, and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Figure 9:
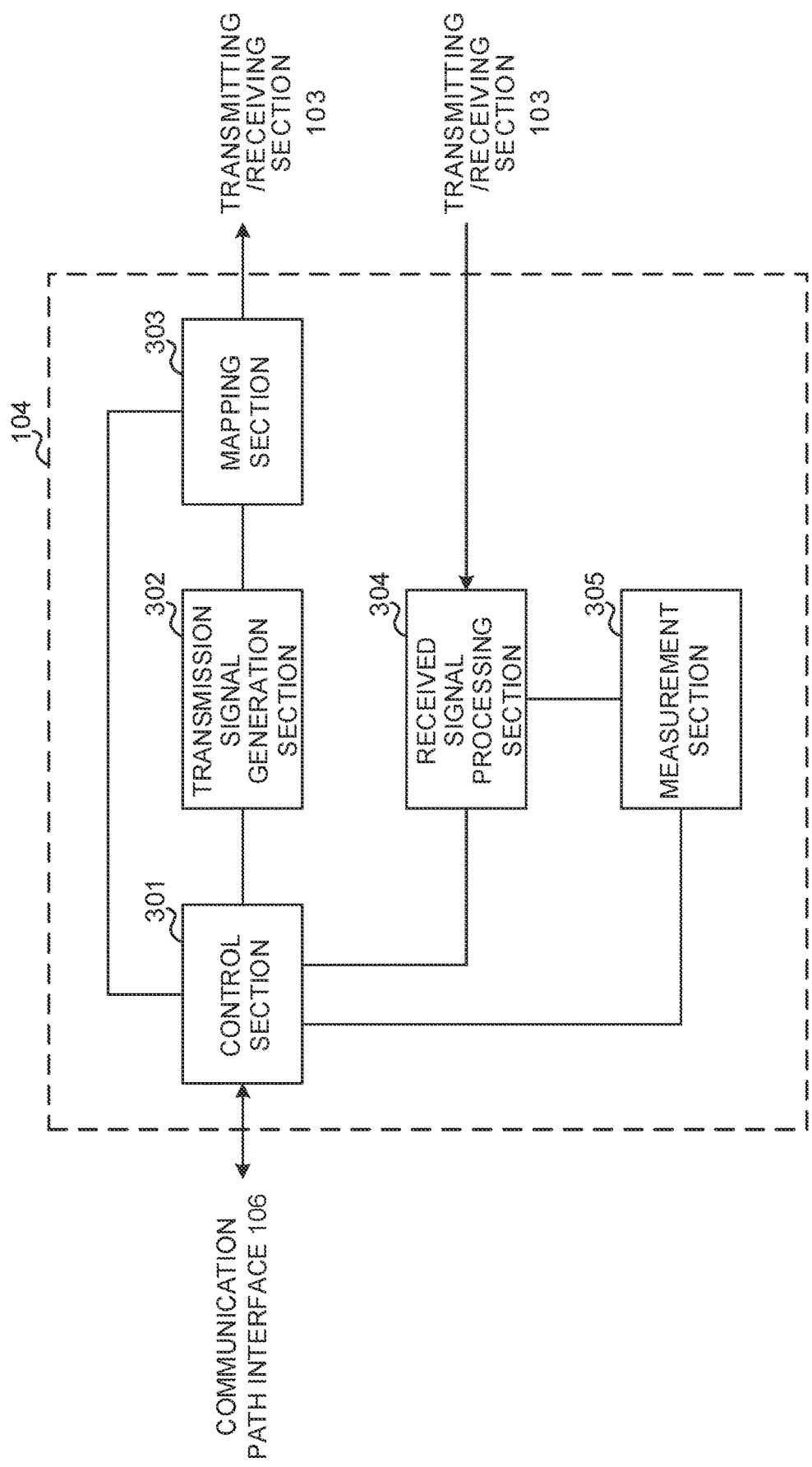
FIG. 9 is a diagram to show an example of a functional structure of the radio base station according to the present embodiment.

FIG. 9 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH, transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, such as transmission confirmation information), a random access preamble (for example, a signal transmitted on the PRACH), an uplink reference signal, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

The transmission signal generation section 302 generates DCI, based on a command from the control section 301, for example. For example, the DCI is at least one of the DL assignment to report assignment information of downlink data, UL grant to report assignment information of uplink data, DCI including SFI, and the like. For a downlink data signal, encoding processing and modulation processing are performed in accordance with a coding rate, modulation scheme, or the like determined based on channel state information (CSI) from each user terminal 20. The downlink data signal may include information configured by higher layer signaling.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based or general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

Note that the transmitting/receiving sections 103 may transmit downlink control information (DCI). The DCI may include at least a certain field value (TPC command field value) indicating a TPC command. Specifically, the transmitting/receiving sections 103 may transmit a plurality of pieces of downlink control information each including a TPC command field value (the first field value) to be used for control of a transmission power of an uplink control channel and a PRI field value (the second field value) to be used to determine a resource for the uplink control channel.

The transmitting/receiving sections 103 may receive uplink control channels (PUCCHs). The transmitting/receiving sections 103 may transmit configuration information (for example, PUCCH resources and the like) related to the uplink control channels by higher layer signaling.

In a case of configuring the PRI field values included in the plurality of respective pieces of downlink control information to be the same value, the control section 301 may control configuration of the TPC command field values.

Specifically, in a case that each of the plurality of pieces of downlink control information schedule at least one downlink shared channel in a different slot and a different cell, the control section 301 may configure the TPC command field values in a plurality of pieces of downlink control information for scheduling downlink shared channels in the same slot to be the same value (the second aspect, the second accumulation).

Alternatively, in a case that each of the plurality of pieces of downlink control information schedules at least one downlink shared channel in a different slot and a different cell, the control section 301 may configure the TPC command field values in the plurality of pieces of downlink control information to be the same value (the third aspect).

<User Terminal>

Figure 10:
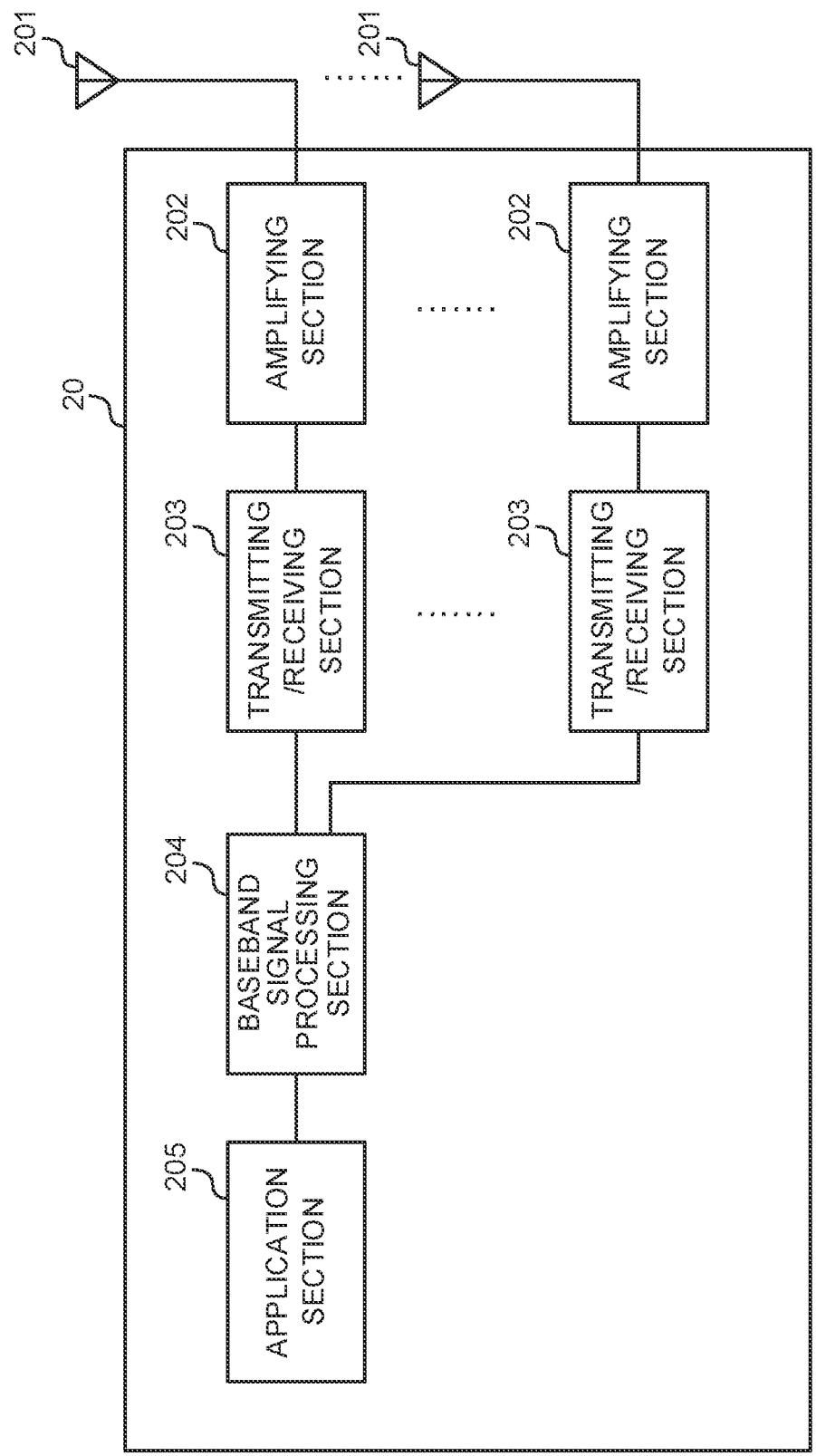
FIG. 10 is a diagram to show an example of an overall structure of a user terminal according to the present embodiment.

FIG. 10 is a diagram to show an example of an overall structure of a user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Figure 11:
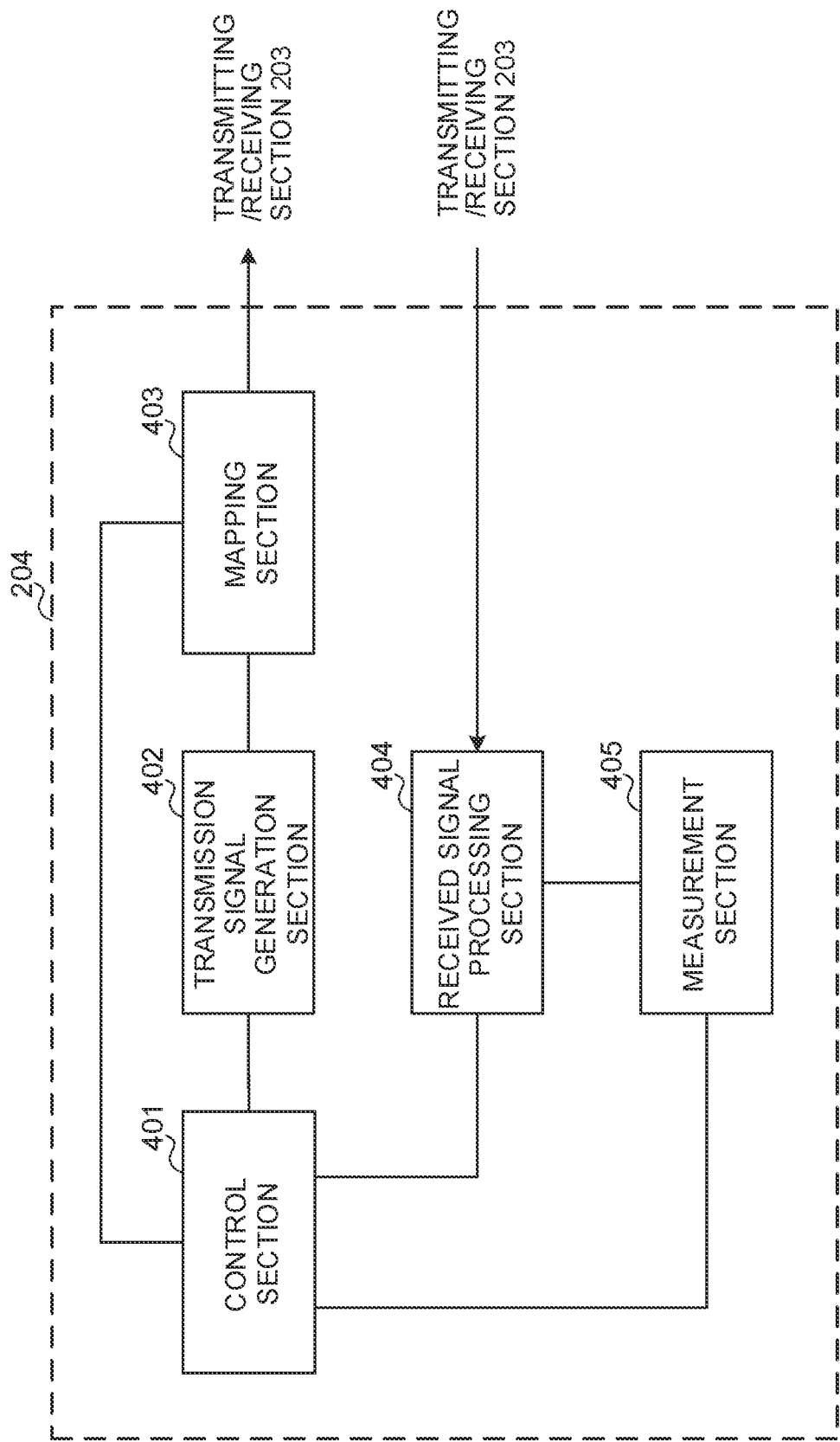
FIG. 11 is a diagram to show an example of a functional structure of the user terminal according to the present embodiment.

FIG. 11 is a diagram to show an example of a functional structure of a user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that the transmitting/receiving sections 203 may receive downlink control information (DCI). The DCI may include at least a certain field value (TPC command field value) indicating a TPC command. Specifically, the transmitting/receiving sections 203 may receive a plurality of pieces of downlink control information each including a TPC command field value (the first field value) to be used for control of a transmission power of an uplink control channel and a PRI field value (the second field value) to be used to determine a resource for the uplink control channel.

The transmitting/receiving sections 203 may transmit uplink control channels (PUCCHs). The transmitting/receiving sections 203 may receive configuration information (for example, PUCCH resources and the like) related to the uplink control channels by higher layer signaling.

In a case that the same resource is determined based on the PRI field values included in the plurality of respective pieces of downlink control information, the control section 401 may control accumulation of the transmission power control (TPC) commands indicated by the TPC command field values.

Specifically, in a case that the same resource is determined based on the PRI field values included in the plurality of respective pieces of downlink control information, the control section 401 may control a transmission power of the uplink control channel, based on the accumulated value of the TPC commands indicated by the TPC command field values in all the pieces of DCT among the plurality of pieces of downlink control information (the first aspect).

In the case that the same resource is determined based on the PRI field values included in the plurality of respective pieces of downlink control information, the control section 401 may control a transmission power of the uplink control channel, based on the accumulated value of the TPC command indicated by the TPC command field value in the piece of downlink control information for scheduling a downlink shared channel in a specific cell among the plurality of pieces of downlink control information (the second aspect, the first accumulation).

In the case that the same resource is determined based on the PRI field values included in the plurality of respective pieces of downlink control information, the control section 401 may control a transmission power of the uplink control channel, based on the accumulated value of the TPC command indicated by the TPC command field value in the piece of downlink control information for scheduling the last downlink shared channel among the plurality of pieces of downlink control information (the second aspect, the second accumulation).

In the case that the same resource is determined based on the PRI field values included in the plurality of respective pieces of downlink control information, the control section 401 may control the transmission power, based on the accumulated value of the TPC command indicated by the TPC command field value in a piece of downlink control information arbitrarily selected from among the plurality of pieces of downlink control information (the third aspect).

For example, the control section 401 may select downlink control information for scheduling a certain downlink shared channel from among the plurality of pieces of downlink control information. The control section 401 may select downlink control information detected in at least one of a certain slot and a certain cell from among the plurality of pieces of downlink control information.

The control section 401 may use the TPC command field values in the other pieces of downlink control information among the plurality of pieces of downlink control information, as virtual cyclic redundancy check (CRC) bits (the third aspect).

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically, aggregated, or may be realized by directly and/or indirectly connecting two or more physically and/or logically separate pieces of apparatus (via wire and/or wireless, for example) and using these plurality of pieces of apparatus.

Figure 12:
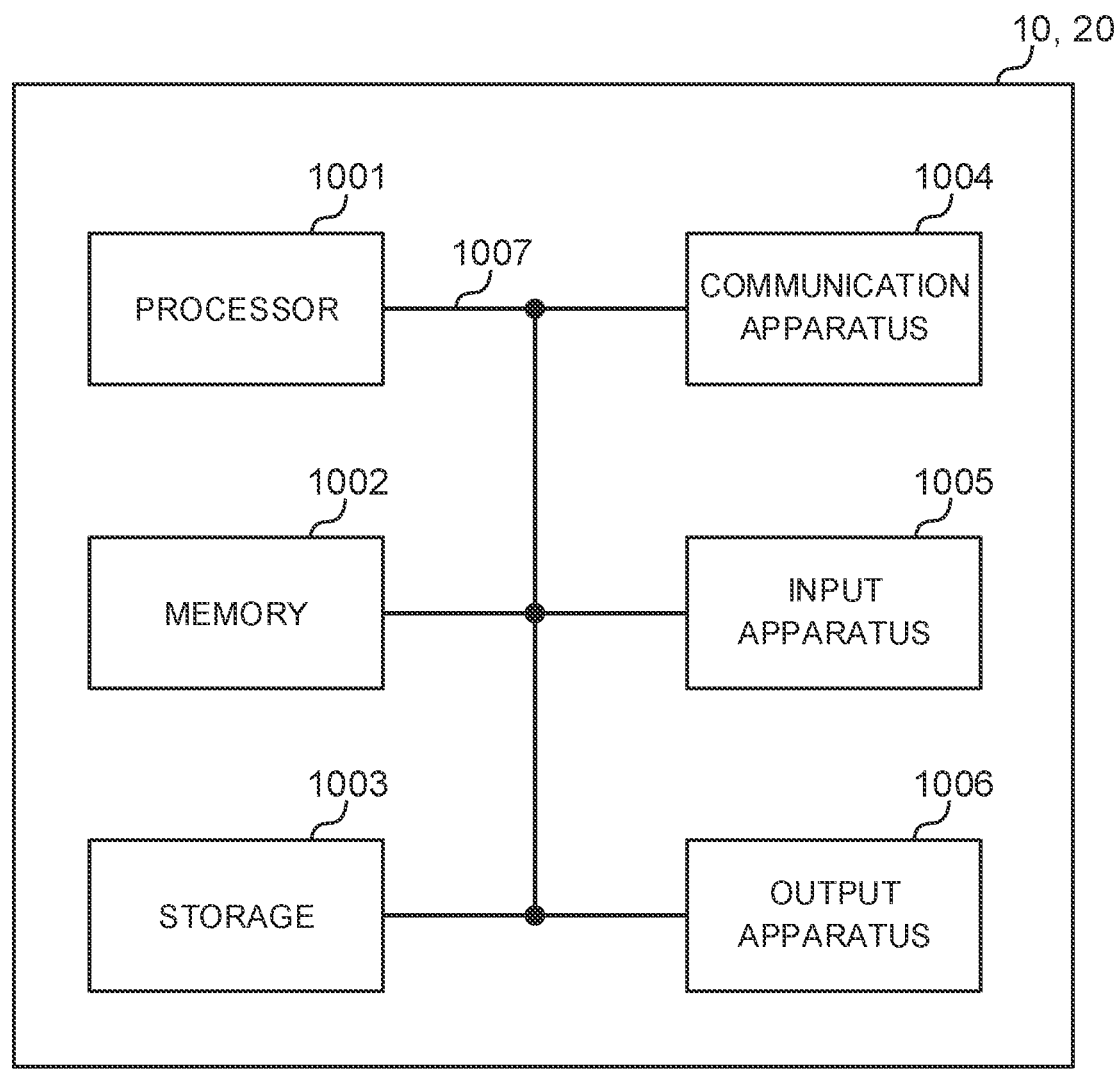
FIG. 12 is a diagram to show an example of a hardware structure of the radio base station and the user terminal according to the present embodiment.

For example, a radio base station, a user terminal, and so on according to the present embodiment may function as a computer that executes the processes of the radio communication method of the present disclosure. FIG. 12 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations no control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable RPM) an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), are FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be, the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location. (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (LTE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "up link" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), NewRAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term. "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims.

Consequently, the description in this specification is provided only for the purpose of explaining examples, and should by no means be construed to limit the invention according to the present disclosure in any way.

The invention claimed is:

1. A terminal comprising:
a receiving section that receives a plurality of downlink control information (DCI) including a transmission power control (TPC) command field value used to control uplink control channel (PUCCH) transmission power; and
a control section that, when the plurality of DCI indicates a PUCCH transmission in a same slot, controls the transmission power based on an accumulated value of a TPC command indicated by the TPC command field value included in the plurality of DCI,
wherein the control section determines transmission power for a transmission occasion of the PUCCH transmission in the same slot, based on an accumulated value of a TPC command for a last transmission occasion with a same power adjustment state index.

2. A radio communication method for a terminal, comprising:
receiving a plurality of downlink control information (DCI) including a transmission power control (TPC) command field value used to control uplink control channel (PUCCH) transmission power; and
when the plurality of DCI indicates a PUCCH transmission in a same slot, controlling the transmission power based on an accumulated value of a TPC command indicated by the TPC command field value included in the plurality of DCI,
wherein, in the terminal, transmission power for a transmission occasion of the PUCCH transmission in the same slot is determined based on an accumulated value of a TPC command for a last transmission occasion with a same power adjustment state index.

3. A base station comprising:
a transmitting section that transmits a plurality of downlink control information (DCI) including a transmission power control (TPC) command field value used to control uplink control channel (PUCCH) transmission power; and
a control section that, when the plurality of DCI indicates a PUCCH transmission in a same slot, controls reception of the PUCCH, the transmission power of the PUCCH being controlled based on an accumulated value of a TPC command indicated by the TPC command field value included in the plurality of DCI,
wherein transmission power for a transmission occasion of the PUCCH transmission in the same slot is determined based on an accumulated value of a TPC command for a last transmission occasion with a same power adjustment state index.

4. A system comprising a base station and a terminal, wherein
the base station comprises:
a transmitting section that transmits a plurality of downlink control information (DCI) including a transmission power control (TPC) command field value used to control uplink control channel (PUCCH) transmission power; and
a first control section that, when the plurality of DCI indicates a PUCCH transmission in a same slot, controls reception of the PUCCH, the transmission power of the PUCCH being controlled based on an accumulated value of a TPC command indicated by the TPC command field value included in the plurality of DCI, and
the terminal comprises:
a receiving section that receives the plurality of DCI; and
a second control section that, when the plurality of DCI indicates a PUCCH transmission in a same slot, controls the transmission power based on an accumulated value of a TPC command indicated by the TPC command field value included in the plurality of DCI, wherein transmission power for a transmission occasion of the PUCCH transmission in the same slot is determined based on an accumulated value of a TPC command for a last transmission occasion with a same power adjustment state index.

* * * * *